Patented Apr. 25, 1939

2,155,639

UNITED STATES PATENT OFFICE 2,155,639

RUBBER-LIKE MATERIAL AND METHOD OF PRODUCING SAME

Theodore F. Bradley, Westfield, N. J., assignor to American Cyanamid Company, New York, N. Y., a corporation of Maine No Drawing. Application August 30, 1935, Serial No. 38,516

4 Claims. (Cl. 260—75)

This invention relates to rubber-like esters having the property of being heat convertible without losing their flexibility characteristics, and to processes of preparing said esters.

The object of this invention is to prepare poly-esters or alkyd complexes of rubber-like rather than of resinous nature, said esters being converted by heating into products which are infusible and substantially insoluble in most common solvents, while yet retaining a high degree of flexibility or distensibility, considerable elasticity and tensile strength. It is a further object of this invention to apply and utilize said rubber-like poly-esters for the production of coating and impregnating compositions, plastics, molded products and the like.

In the art of preparing esters from various polybasic acids and polyhydric alcohols, it has generally been found and commonly accepted that the glycol esters of the polybasic acids are liquid, resinous, or even semi-crystalline products which are not converted by heat to insoluble and infusible forms.

I have found that by condensing certain long-chain glycols having eight or more atoms in the chain separating the hydroxy groups, with heat stable acids containing three or more carboxyl groups, there are produced a series of new compounds having unique properties and being totally different from prior art products in this field.

The following, given purely by way of illustration and not in limitation, is one example of preparing a rubber-like material in accordance with my invention.

Example 1

An anhydride of a tetra basic acid having a molecular weight of about 468 and corresponding generally to the formula $C_{28}H_{36}O_6$, was prepared by reacting 75 parts by weight of d-limonene with 50 parts by weight of maleic anhydride by heating under reflux. In this reaction, which becomes exothermic after a temperature of 150° C. is attained, the limonene apparently undergoes rearrangement with formation of at least two dienes, which then combine with maleic anhydride, yielding dibasic acid anhydride and tetra-basic acid anhydride. The dibasic acid constituents, which are found to be incapable of forming rubber-like poly-esters in accordance with the present invention, are removed from the reaction mixture after completion of the reaction by distillation at a pressure of 10 mm. of mercury or less, leaving as a relatively non-distillable residue, the tetra-basic acid anhydride or anhydrides in resinous form.

Similarly di- and tetra-basic acid anhydrides can be obtained from the reaction of dipentene, alpha phellandrene, terpinolene, alpha or beta pinene, or turpentine with maleic anhydride.

The tetra-basic acid prepared as above was mixed as follows:

208 parts by wt. of the tetra-basic acid anhydride (mol wt.=468)
160 parts by weight of tetra ethylene glycol.

This mixture was reacted in the presence of carbon dioxide and under partial reflux conditions, the temperature being carried to 200° C. in ½ hour and raised to 250° C. in another 20 minutes. The reaction mixture gelled to an infusible form after 52 minutes at 250° C. yielding a very flexible and rubber-like poly-ester.

Example 2

Another tetra-basic acid was prepared by reacting the following ingredients as described:

| | Parts |
|---|---|
| Maleic anhydride = ½ mol | 49 |
| l-α-phellandrene = ½ mol | 68 |

The maleic anhydride was heated to about 150° C. and the phellandrene was added slowly from a dropping funnel, with frequent agitation and at a rate which maintained the temperature at 170°–180° C. The temperature was finally raised to 200° C. during the last half hour following the addition of all of the phellandrene. Upon allowing the reaction mixture to cool to room temperature, it was observed to set to a hard crystalline mass. Upon dissolving this mass in 65 parts of warm benzene and allowing the solution to stand over night, a large yield of white crystalline dibasic acid anhydride was obtained. This was recovered, washed with benzene and dried. Several additional crops of the crystalline dibasic acid anhydride were obtained and the mother liquor was heated to evaporate the volatile solvents. The residue after evaporation was vacuum distilled and there remained 19 parts of a non-volatile resinous substance. This resinous substance represents about 16.5% of the product and upon analysis is found to be mainly the anhydride of a tetra-basic carboxylic acid having a molecular weight of 468 and a neutralization equivalent of 117. This tetra-basic acid is combined with tetra-ethylene glycol as in Example 1 and there is obtained a very flexible, rubber-like poly-ester.

The following are additional examples of products prepared in accordance with my invention.

Example 3

A condensation reaction is carried out by heating at 150° C., 278 parts by weight of beta eleostearic acid with 98 parts by weight of maleic anhydride. This reaction yielded a partial anhydride of a tri-basic carboxylic acid having a molecular weight of 376. A flexible product was prepared from this acid by the following method:

7.6 parts by weight of tri-basic acid made from beta eleostearic acid and maleic anhydride
4.5 parts by weight of tri-ethylene glycol This mixture was reacted by heating to 250° C. in 70 minutes and after an additional period of 89 minutes yielded an infusible and very rubber-like gel.

Example 4

218 parts by weight of the glycerol tri ester of beta eleostearic acid (or beta eleostearine) was condensed with 73 parts by weight of maleic anhydride yielding a viscous liquid of poly acidic nature. 86 parts by weight of tri-ethylene glycol was combined with 222 parts by weight of said material by reacting at 200 to 216° C. until completely gelled or infusible.

Example 5

436 parts by weight of tung oil containing from 80% to 85% of alpha eleostearine and the usual impurities (olein) was condensed with 139 parts by weight of fumaric acid yielding a viscous liquid of poly acidic nature. 150 parts by weight of tri-ethylene glycol was combined with 500 parts by weight of said material by reacting at from 200 to 240° C. for several hours until an infusible and rubber-like gel had been obtained.

Example 6

A mixture is made containing 580 parts by weight of tri-ethylene glycol and 1195 parts by weight of an acid material containing approximately 40% tetra-basic acid anhydride (molecular weight=468) and about 60% di-basic acid anhydride (molecular weight=234). The acid material is derived from the reaction of dipentene and maleic anhydride under controlled conditions which favor the formation of the tetra-basic acid anhydride as, for instance, utilizing the method described in Example 2, substituting the dipentene in an equivalent amount for the phellandrene.

This mixture is heated to 250° C. in 2¾ hours and held at 250° C.–280° C. for 4 hours until a rubber-like gel is obtained.

The foregoing examples represent reactions in which approximately theoretical combining equivalents of the poly glycols and poly-basic acids have been employed and in general such procedure should be used. I do not, however, limit myself to such proportions since it has been found possible to vary the ratios of the glycols and polybasic acids to some extent on both the acidic and alcoholic side of the theoretical neutrality point. The use of a theoretical excess of the poly glycols acts to soften the polymers and if carried to excess will inhibit their gelation, while the use of an excess of acid generaly reduces the distensibility and increases hardness and will increase the velocity of gel formation unless carried too far in excess.

It is to be understood that the polybasic acids and the anhydrides thereof are strictly equivalents and when the acid is specified its anhydride is also implied and will be equally as suitable.

Polybasic carboxylic acids containing three or more reactive and heat stable carboxyl groups or their anhydride equivalents, and preferably at least four of said groups are generally required for the practice of this invention.

Suitable acids must therefore contain three or more functional carboxyl groups or their anhydride equivalent. Ordinary dibasic acids including phthalic, succinic, adipic, sebacic and certain unsaturated acids which do not tend to associate such as, for example, Δ-4 tetra hydro phthalic acid, the dibasic acid resulting from the condensation of laevo alpha phellandrene with maleic anhydride, the dibasic acids resulting from the condensation of cineole with maleic anhydride and the liquid dibasic acids resulting from the condensation of pinene, limonene, dipentene, terpinolene, commercial terpinene and the like with maleic anhydride, are all quite unsuitable for the practice of this invention except as they may be employed as modifying or extending agents for special purposes. Even then it is preferred not to use more than 60% of the dibasic acid-glycol products.

While the bulk of the products which are derived by reaction of various terpenes with maleic anhydride are not well suited for the purposes of the present invention, I have found that these same reactions may result in the formation of some constituents which are suitable for my purpose. Thus, these reactions which result in the production of liquid or in some cases of resinous or even of crystalline, dibasic acid anhydrides in major proportions, also may yield, in addition, minor proportions of tetra-basic acid anhydrides and occasionally of polymers of even greater molecular weight and of greater poly basicity. The tetra-basic acid anhydrides and other such constituents of molecular weight in excess of 460 are suitably isolated and recovered in usable form by distilling off the dibasic acid anhydrides at pressures of 10 mm. or less and/or by extracting the dibasic acid anhydrides with ligroin or with other light petroleum distillates, leaving the more polybasic constituents as non-volatile or insoluble residues which may then be utilized for the practice of the present invention.

I am aware that citric acid, a tribasic acid, has previously been combined with glycols and with poly glycols but this acid is highly unstable and when heated to the usual esterification temperatures, rapidly decomposes into di and monobasic acids with loss of water and of carbon dioxide. Thus, it cannot be classed as a heat stable tribasic carboxylic acid, and on account of its heat-instability and of the poor water resistance of its derivatives, citric acid is quite unsuited for the purposes of the present invention, except when employed as a diene reagent in the synthesis of other, quite different acids. In other words, the acids which I utilize are those which are stable when heated to esterification temperatures.

Various other polybasic acids of the type which react with glycols to yield infusible poly-esters may be substituted in equivalent proportions for those specified in the foregoing examples. Among such, the tri-basic carboxylic acids or anhydrides resulting from the condensation of rosin or of abietic acid and of maleic anhydride, maleic acid or fumaric acid may be used.

For the purposes of the present invention it has been found that poly glycols or long chain glycols are required, it being especially advantageous to employ poly ethylene glycols such as tri-ethylene glycol, tetra ethylene glycol and the higher homologues of this series. While the particular poly glycol which is to be employed can be varied according to the physical properties desired and according to the nature of the polybasic acid which is to be used, it is generally necessary to employ a poly ethylene glycol of no lesser molecular weight than that of tri-ethylene glycol, and preferably tetra ethylene glycol.

While in some cases I may prefer, for economic or technical reasons, to employ mixtures of the poly glycols with other polyhydric alcohols such as glycerol, poly glycerols, ethylene glycol, propylene glycols, etc., it must be understood that such use tends to harden the poly-esters and to impair their distensibility, which effect is especially noticeable when the polymers are subjected to low temperatures and/or when fairly substantial proportions of said substituents are employed. It is then to be distinctly understood that most polyhydric alcohols other than the poly ethylene glycols of the homologous series beginning with tri-ethylene glycol are not equivalents, except in the sense that they combine chemically in a common manner and that the use of such very considerably alters the physical properties and is usually to be avoided except in special cases where it is deemed advisable to alter the rubber-like nature and increase the hardness or to compensate for the physical characteristics introduced by some particular acid.

It is, however, possible to employ as more acceptable substitutes, long chain glycols other than the poly ethylene glycols, i. e., poly methylene, poly propylene, poly butylene or poly amylene glycols. When desiring to employ such, it is most desirable to select those in which the hydroxyl groups are spaced in the terminal positions of the hydrocarbon chain or in any case as widely apart in the molecule as is possible, since close spacing of said functional groups is not conducive to the development of polymers having the required degree of elasticity and distensibility. I have found that those alcohols which have at least 10 atoms separating the terminal hydroxyl groups are preferred for my purpose.

The distensibility of the rubber-like poly-esters is found to be markedly influenced by the chain length of the poly ethylene or other poly glycols used in their preparation, hardness being decreased and distensibility increased as the chain length of the poly glycol is increased. The structure of the acids likewise affects the physical properties of the polymer but in general exert less influence than does the structure of the poly glycols and in any case the effect of the acid may be suitably compensated by appropriate selection of the glycol. In general, it is found that both in the case of the acids and of the glycols that the further apart the reactive groups (i. e., carboxyls or hydroxyls) are spaced in the molecule, the more distensible are the resulting poly-esters.

The rubber-like polymers of this invention can be prepared and fabricated for industrial use in a number of ways. Thus, one may interrupt the initial esterification reaction prior to the gelation and while the condensation polymers are still in the A stage, when organic solvents of the type of acetone, cellosolve, benzene, toluene, xylene, ethyl lactate and the like may be added singly or in admixture. Such solutions can be employed as coating or impregnating compositions either with or without the addition of pigments and/or other additions or extenders. Fillers can be admixed with the solutions, the solvents evaporated and the mixtures then subjected to elevated temperatures ranging usually from 150 to 250° C., to convert the polymers to infusible and insoluble form.

The new poly-esters may also be prepared in jacketed rubber or dough mixers at a suitable elevated temperature and either in the presence or absence of pigments, fillers or other extending agents. While the chemical reactions are effected and carried to the so-called A, B or C stages as desired, the reaction mixture is subjected to constant agitation or mastication. This method of production is particularly desirable in order to expedite the condensation and to complete the cure and is especially advantageous during the conversion of B stage polymers to C stage material. The use of partial vacuum and/or of inert gases such as carbon dioxide or nitrogen is usually of substantial benefit when manufacturing the polymers by the aforesaid process.

Those polymers or compositions containing the same which have not been fully cured to the C stage, but which closely approach the same, have been found to be capable of being molded to desired shape in hydraulic presses by the usual methods well known in that art. The molding operations in this case are merely for the purposes of compacting the material and of fabrication to shape and unlike the phenol or urea and formaldehyde plastics is not employed to effect a cure since curing of my materials can best be properly effected under conditions which permit of the free escape of volatile matter. Following the molding operation, the compositions may be subjected to additional heat treatment to complete the cure.

The curing of these plastics is a vitally important matter since the physical properties, notably strength, distensibility, elasticity, water resistance, oil resistance, etc., are very profoundly influenced by the same. Curing is usually best effected in an inert atmosphere since, especially in the case of those polymers which contain unsaturated linkages, oxidation will occur with attendant loss of distensibility and elasticity. Curing in the presence of air is generally employed whenever increased hardness is desired or the time factor is of vital importance.

Temperatures in excess of 100 C. and generally within the range of 140 to 250° C. are ordinarily required to effect a cure, the exact time of cure ranging from an hour to several weeks according to the thickness of the specimen, the nature and amount of fillers admixed or of the surface which has been coated or impregnated, of the temperatures employed and of the extent to which the environmental conditions allow and facilitate the escape of volatile constituents during the process. It is impossible to specify an exact cure unless all other conditions be known, but in general the cure is best carried on until the progressive loss in weight during said treatment ceases or reaches a very small value and when test specimens exhibit the minimum water absorption upon immersion test.

Some of the thoroughly gelled and infusible substantially B stage polymers of the aforesaid examples were removed from the reaction kettles and placed on mixing rolls where they were incorporated with 50% by weight of medium fibered asbestos and the resulting mixtures then worked up on the rolls and sheeted to an average thickness of 0.08 inch. The sheeted material was then cured in an atmosphere of carbon dioxide for a period of 4 days at a temperature of 150° C. under conditions which permitted of the free escape of moisture and of other volatiles. Standard sized test specimens were then cut and the tensile strengths and elongations determined.

Results were secured as follows:

| Composition of example number | Tensile strength kgs. per sq. cm. | Elongation per cent |
| --- | --- | --- |
| 1 | 105.6 | 34 |
| 3 | 69.7 | 25 |
| 5 | 46.8 | 27 |
| 6 | 60.3 | 45 |
| Control | 25.3 | 19 |

The control consisted of the product obtained by reacting 2 mols of glycerol with 3 mols of sebacic acid and carrying out the reaction to the infusible or gel state. This gel was admixed with asbestos, sheeted and cured in the same manner as the other products listed. It is evident that the control is appreciably weaker and much less distensible than are the products of this invention. The combination of glycerol and sebacic acid were chosen since this material is noteworthy in the field of alkyd resins for its flexibility and rubber-like qualities.

Composition #1 represents a preferred type of the new rubber-like polymers, namely that produced from a tetrabasic acid and tetra ethylene glycol. The inclusion of dibasic acid as in #6 exerted a plasticizing action and permitted the use of tri-ethylene glycol. However, when ethylene glycol or even di-ethylene glycol was substituted for the tri-ethylene glycol of #6, the rubber-like qualities were seriously impaired.

In the case of a tri basic acid polymer such as is represented by #3, fairly satisfactory strength and distensibility were secured from the tri-ethylene glycol ester although both values were appreciably lower than with the tetra basic acid-tetra ethylene glycol polymer. In this, as in the preceding cases, the substitution of lower molecular weight glycols resulted in substantial loss of distensibility.

The maintenance of high strength, yet coupled with a notable improvement of distensibility as compared to the compositions of the prior art is characteristic of the present invention.

The compositions of this invention may frequently be suitably modified with non-drying or drying oils or with derivatives of the same including mono or di glycerides, free fatty acids, polymerized oils, partially oxidized or blown oils, vulcanized oils and the like. They may also be modified by admixture and/or reaction with phenolic aldehyde resins or condensates, vinyl esters or polymers, urea-aldehyde condensates, rosin, ester gum, and the fossil resins or their esters. Such modification is occasionally advantageous, especially in the field of coating compositions. Furthermore the use of monohydric alcohols and of esters, which latter may include alkyl phthalates, alkyl or aryl phosphates, etc. as plasticizers is not precluded. Further it has been found that the compositions of this invention may be admixed and compounded with natural or synthetic rubber and with Duprene and sheeted or extruded to desired form.

Brake blocks of the molded type and laminated or impregnated brake linings, clutch facings and friction members have been made from some of the compositions of this invention and in a number of cases have been found to excel similar products of the older and rubber containing grades, particularly from the standpoint of heat and of oil resistance.

Oilproof seals and gaskets, floor covering compositions, cable insulation, varnished cambric, oil cloth, oil resistant tubing, printing rolls, flexible abrasive wheels, abrasive paper and cloth, paints and enamels likewise constitute products in which the products of this invention are most advantageous.

Other suitable changes may be made in carrying out the invention without departing from the spirit and scope thereof except as defined in the appended claims.

I claim:

1. The process of preparing infusible, flexible, rubber-like resins which comprises reacting a long-chain glycol having at least eight atoms in the chain separating the esterifiable hydroxyl groups with a heat-stable polybasic acid material containing at least 40% of an esterifiable tetrabasic carboxylic acid, said acid material being derived from the chemical combination of an alpha-beta unsaturated polycarboxylic acid and a substance taken from the group consisting of terpenes and diene compounds, and continuing the reaction by heating between 150-280° C. for sufficient time to produce an infusible and substantially insoluble, rubber-like condensation product.

2. The process of preparing infusible, flexible, rubber-like resins which comprises reacting a polyethylene glycol of the homologous series beginning with tetraethylene glycol with a heat-stable polybasic acid material containing at least 40% of an esterifiable tetrabasic carboxylic acid, said acid material being derived from the chemical combination of a terpene and an alpha-beta unsaturated polycarboxylic acid, and continuing the reaction by heating between 150-280° C. for sufficient time to produce an infusible and substantially insoluble, rubber-like condensation product.

3. The process of claim 1 in which the initial reaction product is mixed with a filler prior to continuing the reaction by heating.

4. An infusible, insoluble and flexible rubber-like material produced by the process of claim 1.

THEODORE F. BRADLEY.